United States Patent
Khan et al.

(10) Patent No.: US 8,959,452 B2
(45) Date of Patent: Feb. 17, 2015

(54) METHOD, SYSTEM AND COMPUTER PROGRAM PRODUCT FOR RECEIVING INFORMATION FROM A USER

(71) Applicant: Texas Instruments Incorporated, Dallas, TX (US)

(72) Inventors: Sajjad Mahmood Khan, Allen, TX (US); Joe Dean Hill, Wylie, TX (US); Trevor Thomas Chapman, Dallas, TX (US); Matthew Jason Rea, St. Louis, MO (US)

(73) Assignee: Texas Instruments Incorporated, Dallas, TX (US)

( * ) Notice: Subject to any disclaimer, the term of this patent is extended or adjusted under 35 U.S.C. 154(b) by 321 days.

(21) Appl. No.: 13/649,527

(22) Filed: Oct. 11, 2012

(65) Prior Publication Data
US 2013/0091460 A1    Apr. 11, 2013

Related U.S. Application Data

(60) Provisional application No. 61/545,833, filed on Oct. 11, 2011, provisional application No. 61/592,961, filed on Jan. 31, 2012, provisional application No. 61/623,837, filed on Apr. 13, 2012.

(51) Int. Cl.
  *G06G 5/00*    (2006.01)
  *G06F 15/16*   (2006.01)
  *G06F 17/10*   (2006.01)
  *G06F 3/023*   (2006.01)
  *G06F 3/0488*  (2013.01)

(52) U.S. Cl.
  CPC .......... *G06F 3/0237* (2013.01); *G06F 3/04883* (2013.01); *G06F 3/04886* (2013.01)
  USPC ............ 715/780; 715/803; 345/168; 345/173

(58) Field of Classification Search
  CPC   G06F 3/04886; G06F 3/04883; G06F 3/0236
  USPC ........................... 715/803, 780; 345/168, 173
  See application file for complete search history.

(56) References Cited

U.S. PATENT DOCUMENTS

| | | | | |
|---|---|---|---|---|
| 3,903,510 A | * | 9/1975 | Zobel | 345/162 |
| 4,862,389 A | * | 8/1989 | Takagi | 715/794 |
| 4,891,786 A | * | 1/1990 | Goldwasser | 715/257 |
| 5,056,059 A | * | 10/1991 | Tivig et al. | 715/828 |

(Continued)

OTHER PUBLICATIONS

Friedland et al., Teaching with an intelligent electronic chalkboard, 2004, dl.acm.org.*

*Primary Examiner* — Jordany Nunez
(74) *Attorney, Agent, or Firm* — Michael A. Davis, Jr.; Frederick J. Telecky, Jr.

(57) ABSTRACT

A window is displayed on a display device. The window includes at least first and second portions thereof. In response to a user selecting the first portion of the window on the display device, a first set of keys are displayed on the display device. The first set of keys are operable by the user to specify a first type of information within the first portion of the window. In response to the user selecting the second portion of the window on the display device, a second set of keys are displayed on the display device. The second set of keys are operable by the user to specify a second type of information within the second portion of the window. The second type of information includes at least some information that is unsupported by operation of the first set of keys.

6 Claims, 10 Drawing Sheets

(56) References Cited

U.S. PATENT DOCUMENTS

| | | | | |
|---|---|---|---|---|
| 5,189,609 A | * | 2/1993 | Tivig et al. | 600/300 |
| 5,261,031 A | * | 11/1993 | Saito | 345/440 |
| 5,289,574 A | * | 2/1994 | Sawyer | 715/759 |
| 5,305,014 A | * | 4/1994 | Mutschler et al. | 345/173 |
| 5,333,247 A | * | 7/1994 | Gest et al. | 345/672 |
| 5,365,254 A | * | 11/1994 | Kawamoto | 345/157 |
| 5,371,553 A | * | 12/1994 | Kawamura et al. | 725/59 |
| 5,428,739 A | * | 6/1995 | Maeda | 345/594 |
| 5,463,727 A | * | 10/1995 | Wiggins et al. | 715/841 |
| 5,485,174 A | * | 1/1996 | Henshaw et al. | 345/684 |
| 5,490,096 A | * | 2/1996 | Seto | 703/13 |
| 5,491,795 A | * | 2/1996 | Beaudet et al. | 715/804 |
| 5,495,566 A | * | 2/1996 | Kwatinetz | 715/785 |
| 5,497,455 A | * | 3/1996 | Suga et al. | 715/835 |
| 5,504,855 A | * | 4/1996 | Priem et al. | 345/501 |
| 5,526,481 A | * | 6/1996 | Parks et al. | 715/784 |
| 5,581,243 A | * | 12/1996 | Ouellette et al. | 345/173 |
| 5,585,866 A | * | 12/1996 | Miller et al. | 725/43 |
| 5,612,715 A | * | 3/1997 | Karaki et al. | 345/698 |
| 5,619,637 A | * | 4/1997 | Henshaw et al. | 715/835 |
| 5,621,905 A | * | 4/1997 | Jewson et al. | 715/841 |
| 5,629,733 A | * | 5/1997 | Youman et al. | 725/53 |
| 5,649,188 A | * | 7/1997 | Nomura et al. | 1/1 |
| 5,655,214 A | * | 8/1997 | Mullett | 725/78 |
| 5,680,605 A | * | 10/1997 | Torres | 1/1 |
| 5,692,143 A | * | 11/1997 | Johnson et al. | 715/764 |
| 5,736,976 A | * | 4/1998 | Cheung | 345/168 |
| 5,743,613 A | * | 4/1998 | Jeong | 353/119 |
| 5,757,418 A | * | 5/1998 | Inagaki | 348/14.07 |
| 5,781,246 A | * | 7/1998 | Alten et al. | 725/40 |
| 5,796,383 A | * | 8/1998 | Henshaw et al. | 345/418 |
| 5,812,977 A | * | 9/1998 | Douglas | 704/275 |
| 5,818,450 A | * | 10/1998 | Katsuta | 715/840 |
| 5,821,881 A | * | 10/1998 | Fischer et al. | 341/22 |
| 5,835,692 A | * | 11/1998 | Cragun et al. | 345/419 |
| 5,844,692 A | * | 12/1998 | Jeon | 358/442 |
| 5,867,177 A | * | 2/1999 | Okuyama et al. | 345/473 |
| 5,867,678 A | * | 2/1999 | Amro et al. | 715/786 |
| 5,874,936 A | * | 2/1999 | Berstis et al. | 715/785 |
| 5,874,958 A | * | 2/1999 | Ludolph | 715/781 |
| 5,889,527 A | * | 3/1999 | Tsai | 345/629 |
| 5,897,257 A | * | 4/1999 | Chen | 400/473 |
| 5,933,843 A | * | 8/1999 | Takai | 715/246 |
| 5,936,614 A | * | 8/1999 | An et al. | 345/173 |
| 6,014,140 A | * | 1/2000 | Strand | 345/684 |
| 2013/0174079 A1 | * | 7/2013 | Morley et al. | 715/773 |

\* cited by examiner

A garden with a rectangular shape will be attached to a barn, as shown below. Three sides of the garden will be fenced using a total of 22 meters of fencing. Make a sketch of five possible gardens and record the width, length, and area of each garden.

402

404

*width=?*

*area=?*

*length=?*

METHOD, SYSTEM AND COMPUTER PROGRAM PRODUCT FOR RECEIVING INFORMATION FROM A USER

CROSS-REFERENCE TO RELATED APPLICATIONS

This application claims priority to: (a) U.S. Provisional Patent Application Ser. No. 61/545,833, filed Oct. 11, 2011, entitled CUSTOM KEYPADS FOR EDUCATION, naming Sajjad Mahmood Khan et al. as inventors; (b) U.S. Provisional Patent Application Ser. No. 61/592,961, filed Jan. 31, 2012, entitled CUSTOM KEYPADS FOR EDUCATION, naming Sajjad Mahmood Khan et al. as inventors; and (c) U.S. Provisional Patent Application Ser. No. 61/623,837, filed Apr. 13, 2012, entitled CUSTOM KEYPADS FOR EDUCATION, naming Sajjad Mahmood Khan et al. as inventors. All of the above-identified applications are hereby fully incorporated herein by reference for all purposes.

BACKGROUND

The disclosures herein relate in general to information handling systems, and in particular to a method, system and computer program product for receiving information from a user.

An electronics device may include a touchscreen for receiving information from a user. By operating virtual keys of the touchscreen, the user specifies information (e.g., alphanumeric text information) to the electronics device. However, if too many keys are simultaneously displayed by the touchscreen, then such keys may interfere with efficient use of displayable space on the touchscreen. Conversely, if an insufficient number of keys are simultaneously displayed by the touchscreen, then operation of the electronics device may be too cumbersome or restricted.

SUMMARY

A window is displayed on a display device. The window includes at least first and second portions thereof. In response to a user selecting the first portion of the window on the display device, a first set of keys are displayed on the display device. The first set of keys are operable by the user to specify a first type of information within the first portion of the window. In response to the user selecting the second portion of the window on the display device, a second set of keys are displayed on the display device. The second set of keys are operable by the user to specify a second type of information within the second portion of the window. The second type of information includes at least some information that is unsupported by operation of the first set of keys.

BRIEF DESCRIPTION OF THE DRAWINGS

FIG. 4 is a diagram of a second example screen that is displayed by the system of FIG. 1.

DETAILED DESCRIPTION

Figure 1:
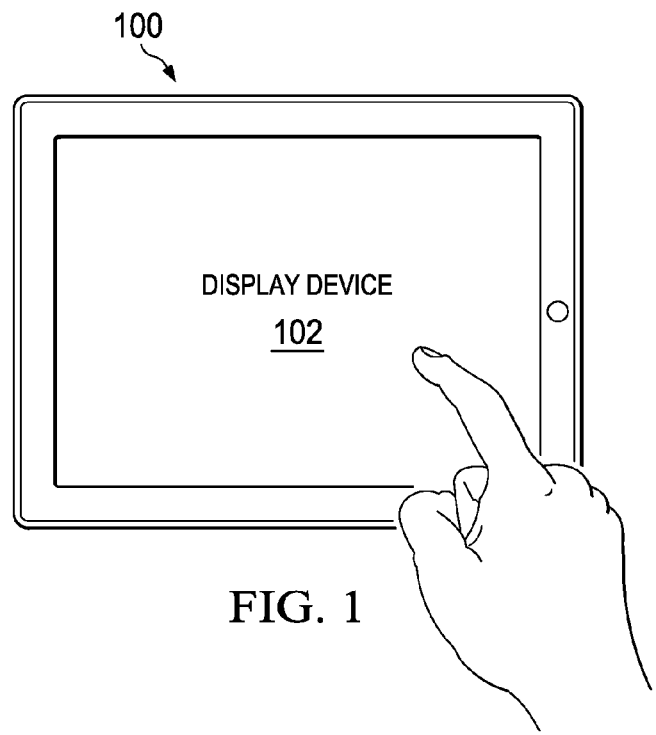
FIG. 1 is a top view of an information handling system of the illustrative embodiments.

FIG. 1 is a top view of an information handling system (e.g., a portable handheld electronics device, such as a tablet computing device, a mobile smartphone, a netbook computer, a laptop computer, or a graphing calculator), indicated generally at 100, of the illustrative embodiments. Accordingly, the system 100 executes various processes and performs operations (e.g., processing, displaying and otherwise communicating information) in response thereto. The system 100 includes a display device 102 for displaying and receiving information.

Figure 2:
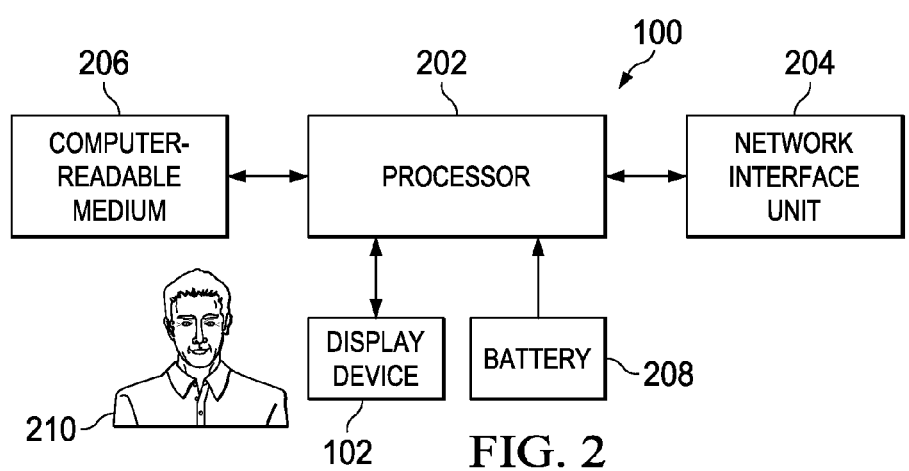
FIG. 2 is a block diagram of the system of FIG. 1.

FIG. 2 is a block diagram of the system 100. The system 100 includes various electronic circuitry components for performing the system 100 operations, implemented in a suitable combination of software, firmware and hardware. Such components include: (a) a processor 202, which is a general purpose computational resource for executing instructions of computer-readable software programs to process data (e.g., a database of information) and perform additional operations (e.g., communicating information) in response thereto; (b) a network interface unit 204 for communicating information to and from a network; (c) a computer-readable medium 206 for storing information, such as a nonvolatile storage device and/or a random access memory ("RAM") device; (d) a battery 208, which is a source of power for the system 100; (e) the display device 102 for displaying information to a human user 210 and for receiving information from the user 210; and (f) other electronic circuitry for performing additional operations. In the illustrative embodiments, the various electronic circuitry components of the system 100 are housed integrally with one another.

Accordingly, the system 100 performs its operations in response to instructions of computer-readable software programs, which are stored on the computer-readable medium 206. Such programs include, but are not limited to: (a) applications, such as applications for word processing, calculator, data collection, lists, statistics, graphing, geometry, querying, polling (e.g., quick polling), and various other functions; (b) a window, dialog and event manager; (c) a settings manager; (d) a power manager; (e) a communication stack; (f) a display driver; (g) a touchpad driver; (h) a universal serial bus ("USB") interface driver; (i) a wireless interface driver; and (j) boot code. Also, the computer-readable medium 206 stores data that are processed by the processor 202, in response to the processor 202 executing such programs.

As shown in FIG. 1, the processor 202 is connected to the display device 102, the computer-readable medium 206, and the battery 208. For clarity, although FIG. 1 shows the battery 208 connected to only the processor 202, the battery 208 is further coupled to various other components of the system 100. Also, the processor 202 is coupled through the network interface unit 204 to the network (not shown in FIG. 1), such as a Transport Control Protocol/Internet Protocol ("TCP/IP")

network (e.g., the Internet or an intranet). For example, the network interface unit 204 communicates information by outputting information to, and receiving information from, the processor 202 and the network, such as by transferring information (e.g. instructions, data, signals) between the processor 202 and the network (e.g., wirelessly or through a USB interface).

The system 100 operates in association with the user 210. In response to signals from the processor 202, the display device 102 displays visual images, which represent information, so that the user 210 is thereby enabled to view the visual images. Also, in the illustrative embodiments, the display device 102 is a touchscreen, such as: (a) a liquid crystal display ("LCD") device; and (b) touch-sensitive circuitry of such LCD device, so that the touch-sensitive circuitry is integral with such LCD device. Accordingly, the user 210 operates the display device 102 (e.g., virtual keys thereof, such as a virtual keyboard and/or virtual keypad) for specifying information (e.g., alphanumeric text information) to the processor 202, which receives such information from the display device 102.

For example, referring also to FIG. 1, the display device 102: (a) detects presence and location of a physical touch (e.g., by a finger of the user 210, and/or by a passive stylus object) within a display area of such touchscreen; and (b) in response thereto, outputs signals (indicative of such detected presence and location) to the processor 202. In that manner, the user 210 can touch (e.g., single tap and/or double tap) the display device 114 to: (a) select a portion (e.g., region) of a visual image that is then-currently displayed by the display device 114; and/or (b) cause the display device 102 to output various information to the processor 202.

Figure 3:
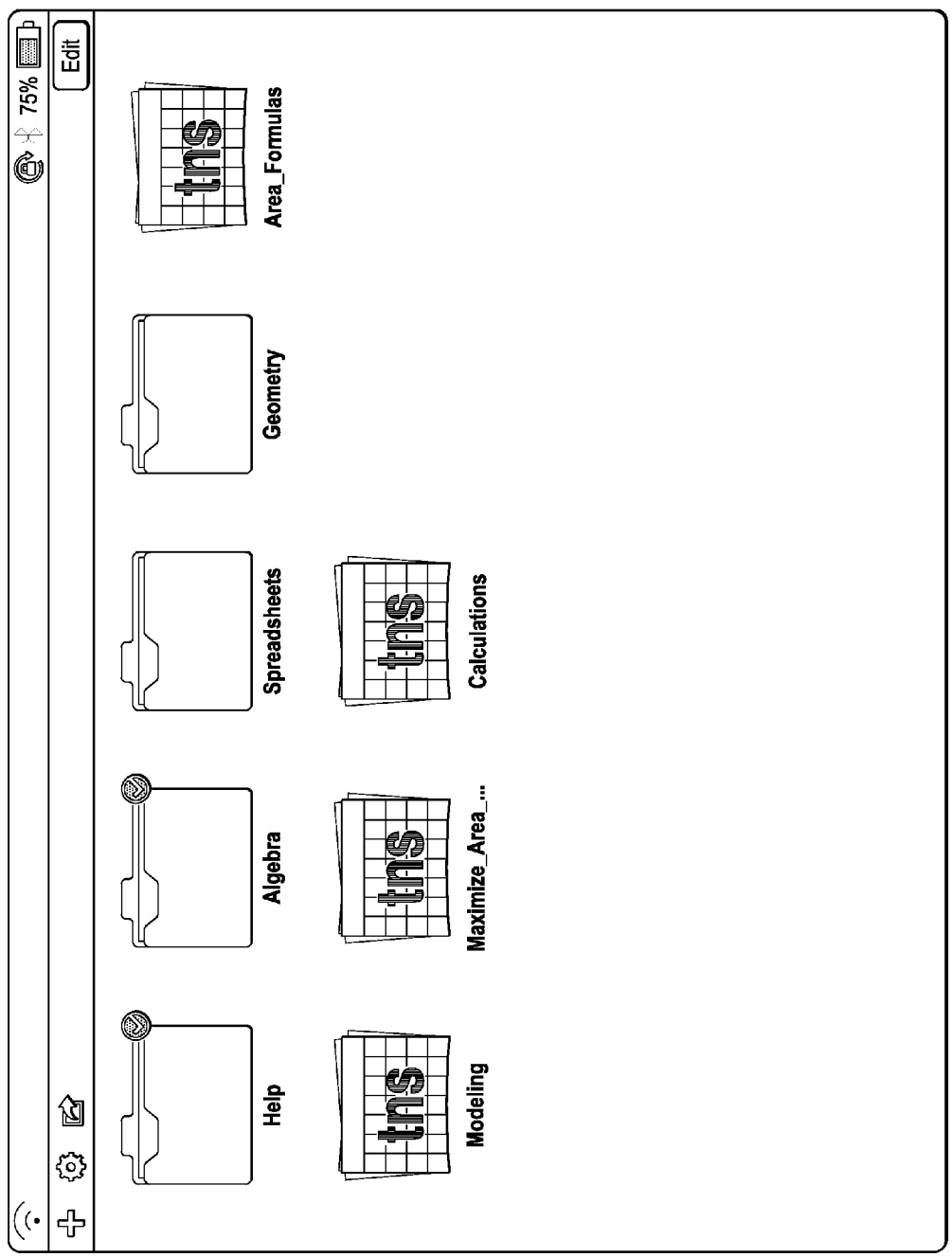
FIG. 3 is a diagram of a first example screen that is displayed by the system of FIG. 1.

FIG. 3 is a diagram of a first example screen that is displayed by the system 100. In the example of FIG. 3: (a) the processor 202 executes a computer-readable software program that includes applications for education; (b) such program is stored on the computer-readable medium 206; and (c) in response to instructions of such program, the processor 202 causes the display device 102 to display icons of various windows. Examples of such icons are shown in FIG. 3, including icons for help, algebra, spreadsheets, geometry, area formulas, modeling, maximize area, and calculations.

FIG. 4 is a diagram of a second example screen that is displayed by the system 100. In the example of FIG. 4: (a) the user 210 has selected the maximize area window by selecting the icon (in the first example screen of FIG. 3) for such window, such as by touching (e.g., double tapping) the icon on the display device 102; and (b) in response thereto, the processor 202 causes the display device 102 to display the selected window for viewing (on the display device 102) by the user 210. As shown in FIG. 4, the processor 202 initially causes the display device 102 to display the selected window without virtual keys (e.g., without a virtual keyboard and/or virtual keypad), so that the user 210 is thereby enabled to view more of the selected window, including: (a) a text portion 402 (within a first subwindow) of the selected window; and (b) a graphics portion 404 (within a second subwindow) of the selected window. Accordingly, in FIG. 4, the display device 102 simultaneously displays the text portion 402 and the graphics portion 404.

Figure 5:
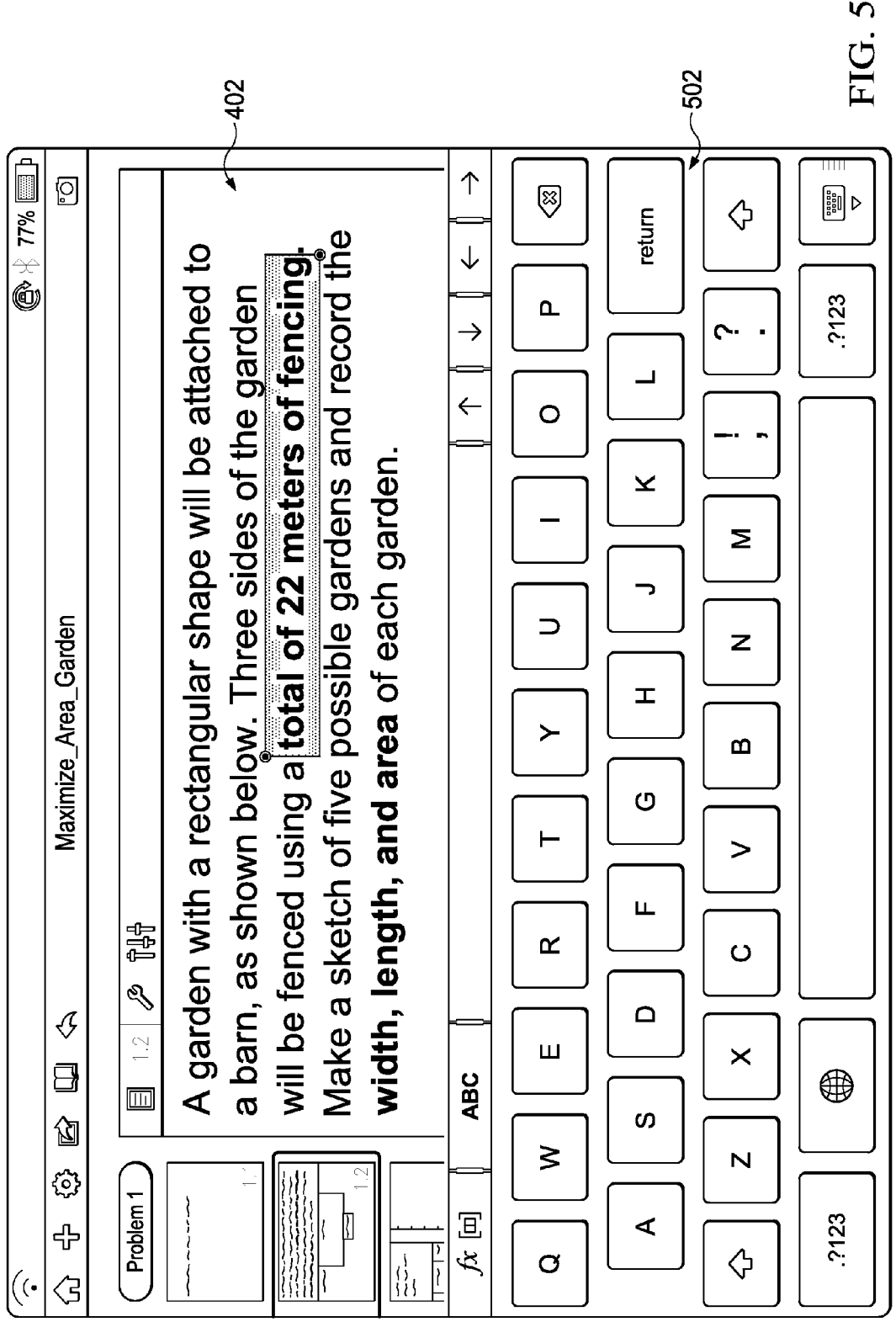
FIG. 5 is a diagram of a third example screen that is displayed by the system of FIG. 1.

FIG. 5 is a diagram of a third example screen that is displayed by the system 100. In the example of FIG. 5: (a) the user 210 has selected the text portion 402 of the maximize area window, such as by touching (e.g., single tapping) the text portion 402 on the display device 102 (in the second example screen of FIG. 4); and (b) in response thereto, the processor 202 causes the display device 102 to display keys (e.g., a virtual keyboard) 502 associated with the selected text portion 402 for viewing (on the display device 102) by the user 210. As shown in FIG. 5, the keys 502 occupy space (on the display device 102) that was previously occupied by the graphics portion 404. The set of keys 502 (e.g., QWERTY keys) are suitable for the user 210 to touch (e.g., single tap) for composing and revising alphanumeric text information within the text portion 402. In that manner, the user 210 operates the keys 502 for specifying information to the processor 202, which: (a) receives such information from the display device 102; and (b) in response thereto, causes the display device 102 to update the displayed screen in accordance with such information, and causes the computer-readable medium 206 to store a record of such update. Accordingly, in response to the user 210 selecting (e.g., single tapping) one of the keys 502, the system 100 performs a respective operation associated with the selected key.

Figure 6:
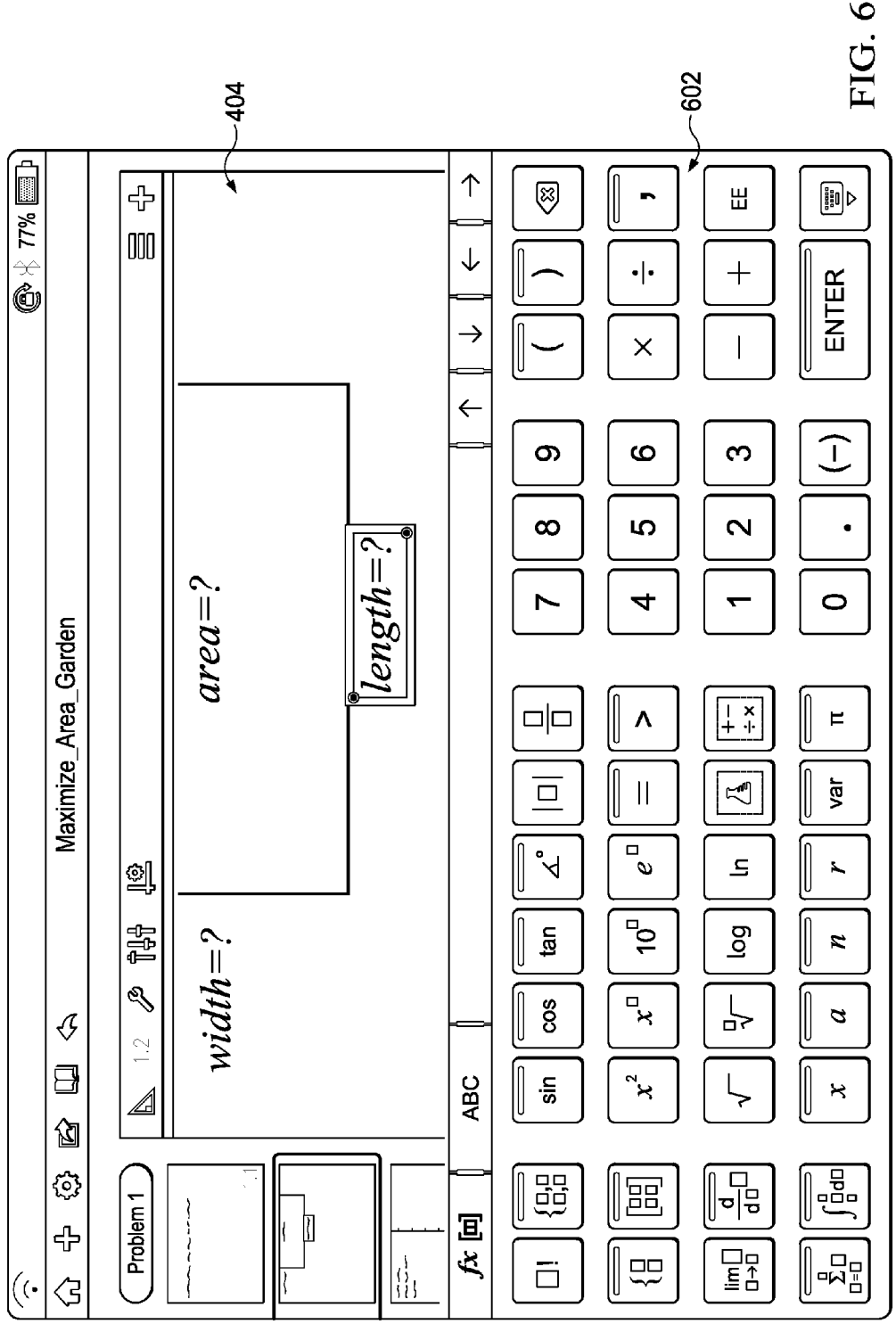
FIG. 6 is a diagram of a fourth example screen that is displayed by the system of FIG. 1.

FIG. 6 is a diagram of a fourth example screen that is displayed by the system 100. In the example of FIG. 6: (a) the user 210 has selected the graphics portion 404 of the maximize area window, such as by touching (e.g., single tapping) the graphics portion 404 on the display device 102 (in the second example screen of FIG. 4); and (b) in response thereto, the processor 202 causes the display device 102 to display keys (e.g., a virtual keypad) 602 associated with the selected graphics portion 404 for viewing (on the display device 102) by the user 210. As shown in FIG. 6: (a) the graphics portion 404 occupies space (on the display device 102) that was previously occupied by the text portion 402; and (b) the keys 602 occupy space (on the display device 102) that was previously occupied by the graphics portion 404. The set of keys 602 (e.g., numeric keys and calculator function keys) are suitable for the user 210 to touch (e.g., single tap) for composing and revising graphics information within the graphics portion 404, including at least some graphics information that is unsupported by operation of the keys 502. In that manner, the user 210 operates the keys 602 for specifying information to the processor 202, which: (a) receives such information from the display device 102; and (b) in response thereto, causes the display device 102 to update the displayed screen in accordance with such information, and causes the computer-readable medium 206 to store a record of such update. Accordingly, in response to the user 210 selecting (e.g., single tapping) one of the keys 602, the system 100 performs a respective operation associated with the selected key.

Figure 7:
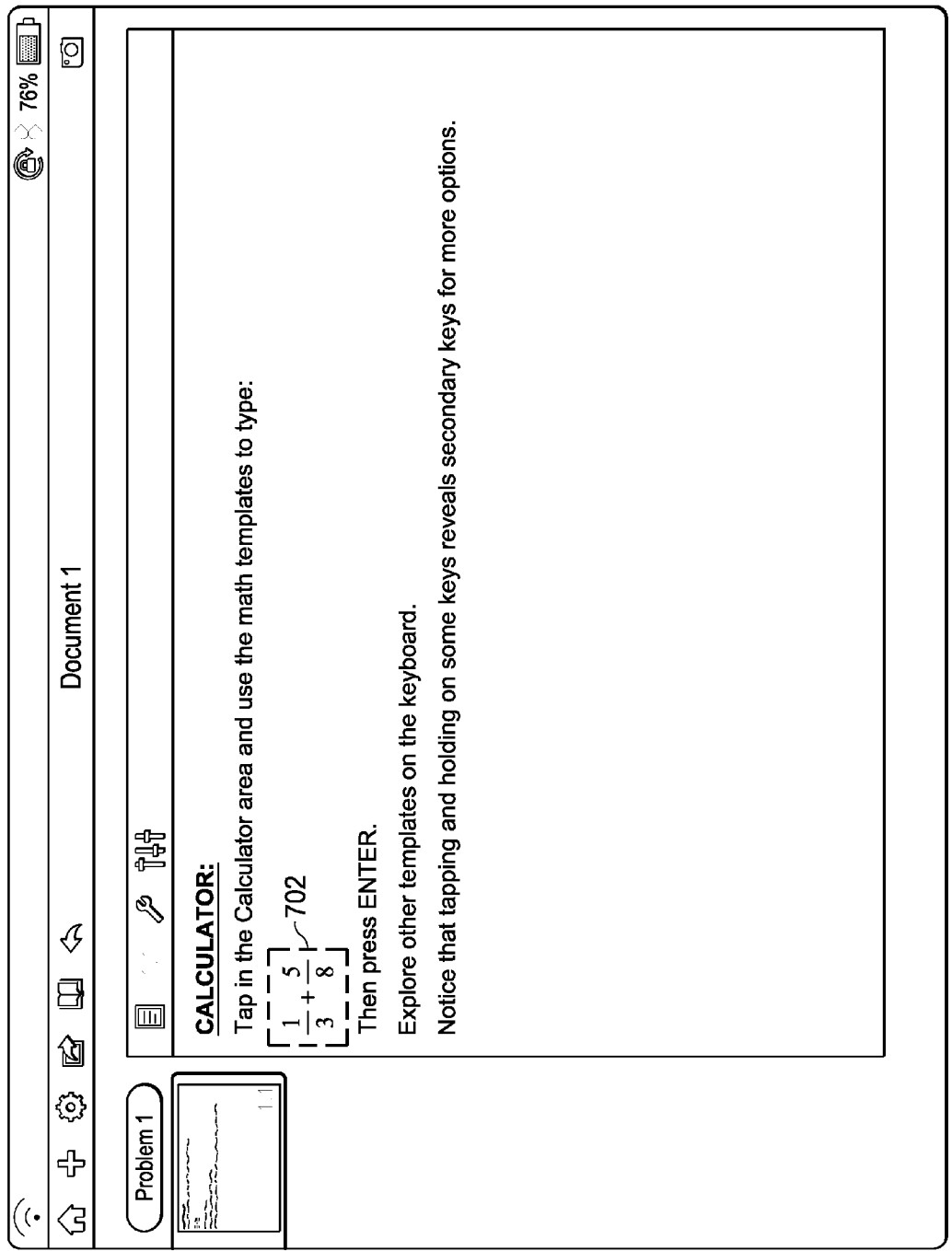
FIG. 7 is a diagram of a fifth example screen that is displayed by the system of FIG. 1.

FIG. 7 is a diagram of a fifth example screen that is displayed by the system 100. In the example of FIG. 7: (a) the user 210 has selected the calculations window by selecting the icon (in the first example screen of FIG. 3) for such window, such as by touching (e.g., double tapping) the icon on the display device 102; and (b) in response thereto, the processor 202 causes the display device 102 to display the selected window for viewing (on the display device 102) by the user 210. As shown in FIG. 7, the processor 202 initially causes the display device 102 to display the selected window without virtual keys (e.g., without a virtual keyboard and/or virtual keypad), so that the user 210 is thereby enabled to view more of the selected window, including: (a) an equation portion, indicated by dashed enclosure 702, of the selected window; and (b) a remaining (e.g., text) portion of the selected window. Accordingly, in FIG. 7, the display device 102 simultaneously displays the equation portion 702 and the remaining (e.g., text) portion. Moreover, as shown in FIG. 7, the equation portion 702 is nested within the remaining (e.g., text) portion.

Figure 8:
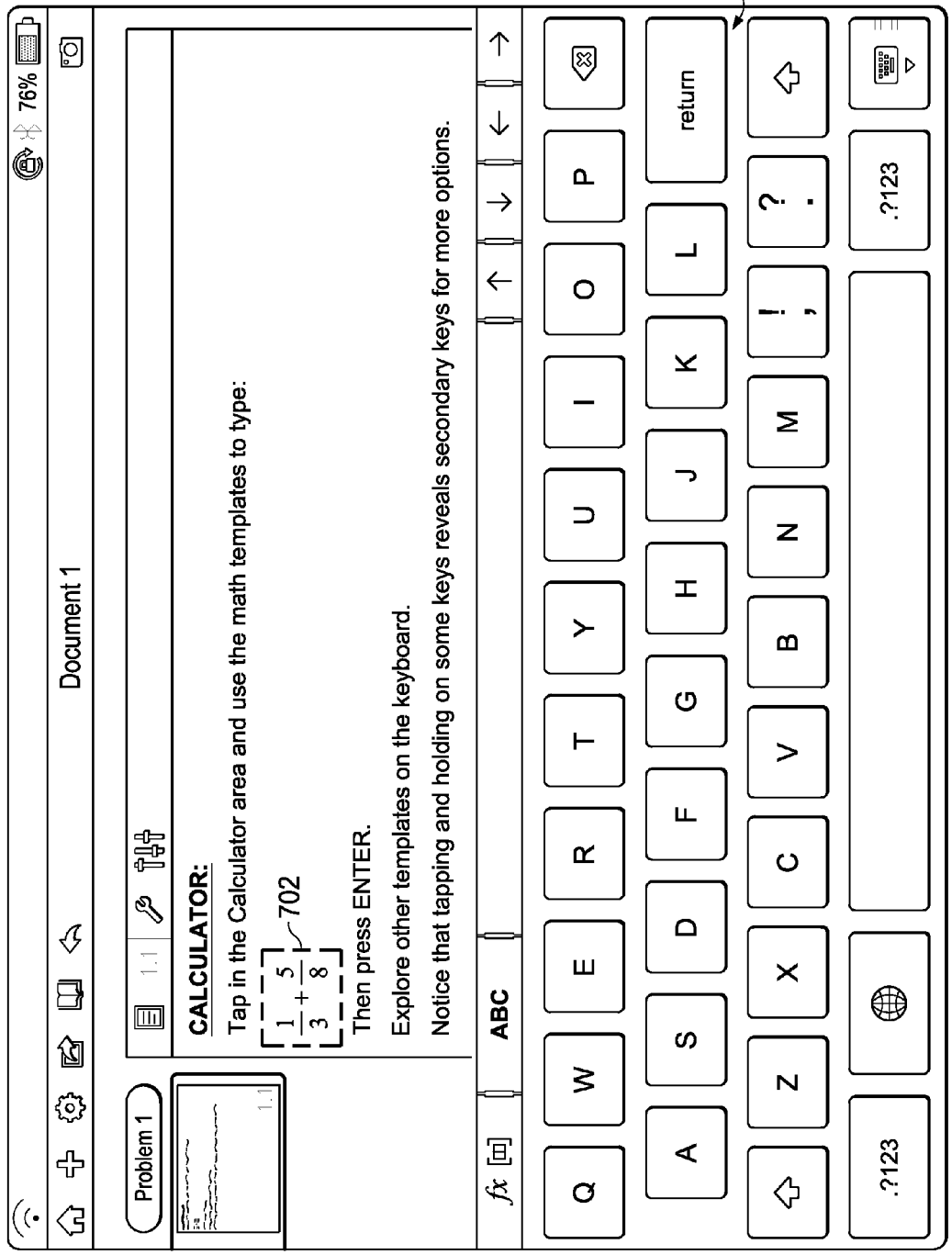
FIG. 8 is a diagram of a sixth example screen that is displayed by the system of FIG. 1.

FIG. 8 is a diagram of a sixth example screen that is displayed by the system 100. In the example of FIG. 8: (a) the user 210 has selected the remaining (e.g., text) portion of the calculations window, such as by touching (e.g., single tapping) the remaining (e.g., text) portion on the display device 102 (in the fifth example screen of FIG. 7); and (b) in response thereto, the processor 202 causes the display device 102 to display keys (e.g., a virtual keyboard) 802 associated with the remaining (e.g., text) portion for viewing (on the display device 102) by the user 210. The set of keys 802 (e.g., QWERTY keys) are suitable for the user 210 to touch (e.g., single tap) for composing and revising alphanumeric text information within the remaining (e.g., text) portion. In that manner, the user 210 operates the keys 802 for specifying information to the processor 202, which: (a) receives such information from the display device 102; and (b) in response thereto, causes the display device 102 to update the displayed screen in accordance with such information, and causes the computer-readable medium 206 to store a record of such update. Accordingly, in response to the user 210 selecting (e.g., single tapping) one of the keys 802, the system 100 performs a respective operation associated with the selected key.

Figure 9:
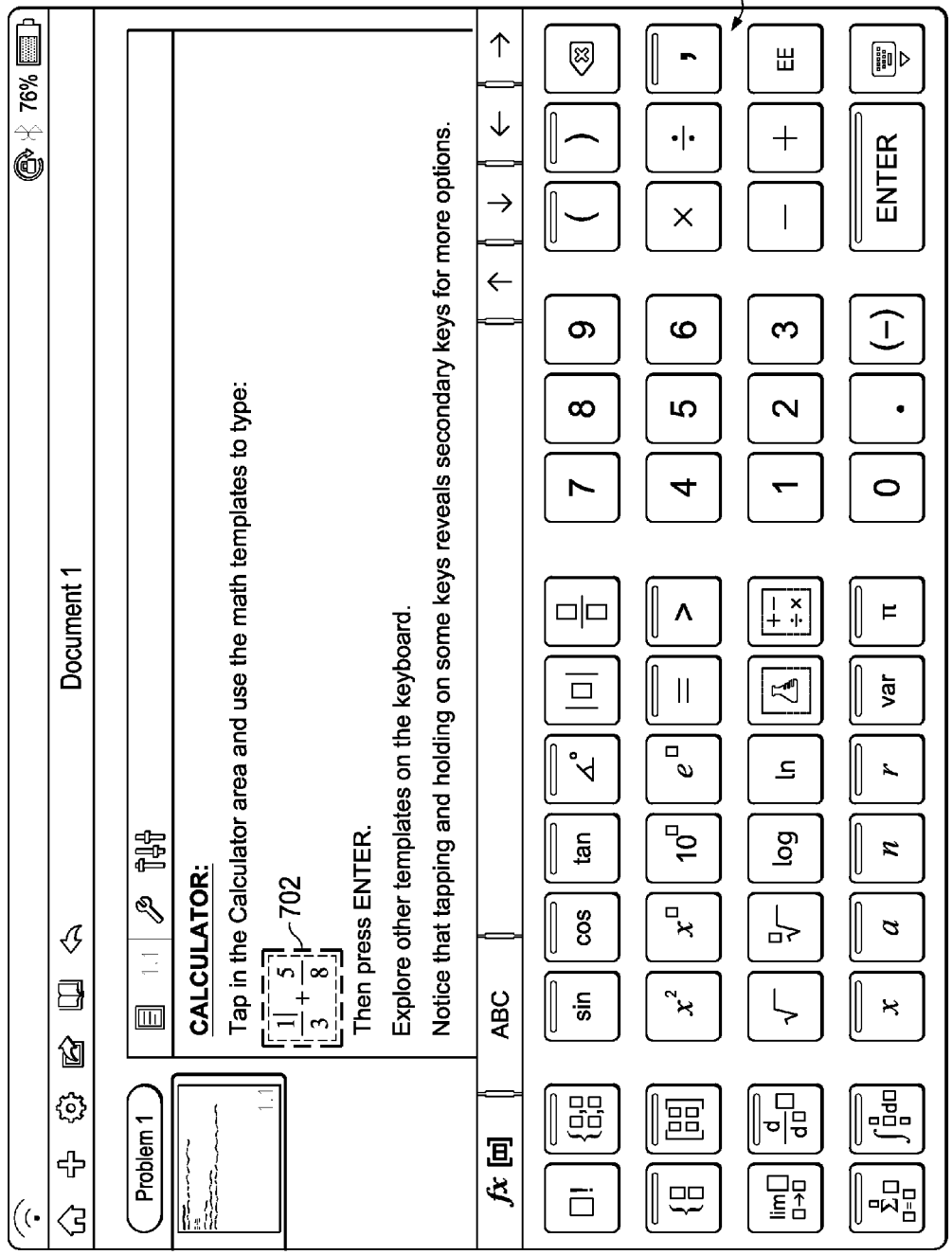
FIG. 9 is a diagram of a seventh example screen that is displayed by the system of FIG. 1.

FIG. 9 is a diagram of a seventh example screen that is displayed by the system 100. In the example of FIG. 9: (a) the user 210 has selected the equation portion 702 of the calculations window, such as by touching (e.g., single tapping) the equation portion 702 on the display device 102 (in the fifth example screen of FIG. 7 or in the sixth example screen of FIG. 8); and (b) in response thereto, the processor 202 causes the display device 102 to display keys (e.g., a virtual keypad) 902 associated with the selected equation portion 702 for viewing (on the display device 102) by the user 210. The set of keys 902 (e.g., numeric keys and calculator function keys) are suitable for the user 210 to touch (e.g., single tap) for composing and revising equation information within the equation portion 702, including at least some equation information that is unsupported by operation of the keys 802. In that manner, the user 210 operates the keys 902 for specifying information to the processor 202, which: (a) receives such information from the display device 102; and (b) in response thereto, causes the display device 102 to update the displayed screen in accordance with such information, and causes the computer-readable medium 206 to store a record of such update. Accordingly, in response to the user 210 selecting (e.g., single tapping) one of the keys 902, the system 100 performs a respective operation associated with the selected key.

Figure 10:
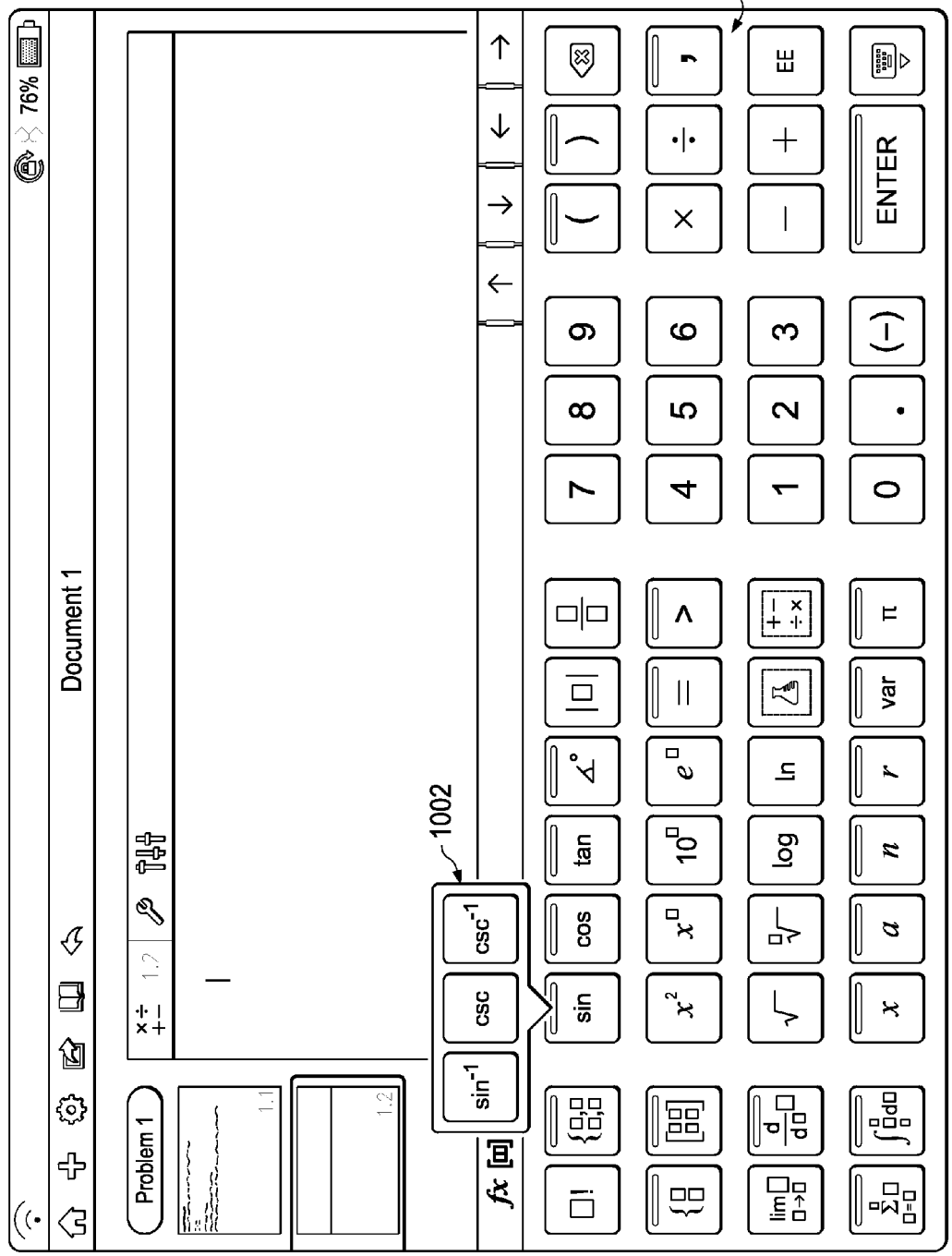
FIG. 10 is a diagram of an eighth example screen that is displayed by the system of FIG. 1.

FIG. 10 is a diagram of an eighth example screen that is displayed by the system 100. In the example of FIG. 10: (a) the user 210 has selected a sine key ("sin") of the keys 902 in a particular manner, such as by prolonged touching (e.g., continuously for a 1-second period) the sine key on the display device 102 (in the seventh example screen of FIG. 9); and (b) in response thereto, the processor 202 causes the display device 102 to display additional keys 1002 associated with the sine key for viewing (on the display device 102) by the user 210. The set of additional keys 1002 (e.g., $sin^{-1}$, csc, and $csc^{-1}$ keys) are suitable for the user 210 to touch (e.g., single tap) for composing and revising equation information within the equation portion 702. For example, in response to the user 210 selecting (e.g., single tapping) one of the additional keys 1002, the system 100 performs a respective operation associated with the selected key.

Accordingly, the sine key is a parent key, and the additional keys 1002 are child keys of the sine key. In the illustrative embodiments, the respective operations associated with child keys are logically grouped and related to a respective operation associated with their parent key. By logically grouping the related child keys in that manner, the system 100 achieves more efficient use of displayable space (on the display device 102), so that the display device 102 hides the child keys until the user 210 selects their parent key in the particular manner. After the display device 102 displays the child keys in response to the user 210 selecting their parent key in the particular manner, the display device 102 again hides the child keys in response to the user 210 again touching the display device 102.

In the illustrative embodiments, a parent key has a distinguishing characteristic (e.g., shared by all parent keys), which visually informs the user 210 that such key is a parent key (having associated child keys) instead of a non-parent key. In the example of FIGS. 9 and 10: (a) the distinguishing characteristic is a horizontal line across a top of such key; and (b) the horizontal line is a particular marking that is shared by all parent keys to visually inform the user 210 that such keys are parent keys instead of non-parent keys. Among the keys 902, parent keys include: (a) the sine key ("sin"), a cosine key ("cos"), and a tangent key ("tan"); (b) an equals key ("=") and a greater-than key (">"); (c) x, a, n and r keys; (d) a variable key ("var") and a pi key ("π"); (e) an open parenthesis key, a closed parenthesis key, and a comma key; and (f) other keys that are likewise indicated by the same distinguishing characteristic. In alternative examples, the distinguishing characteristic is a particular color and/or a particular shape (e.g., shared by all parent keys).

Figure 11:
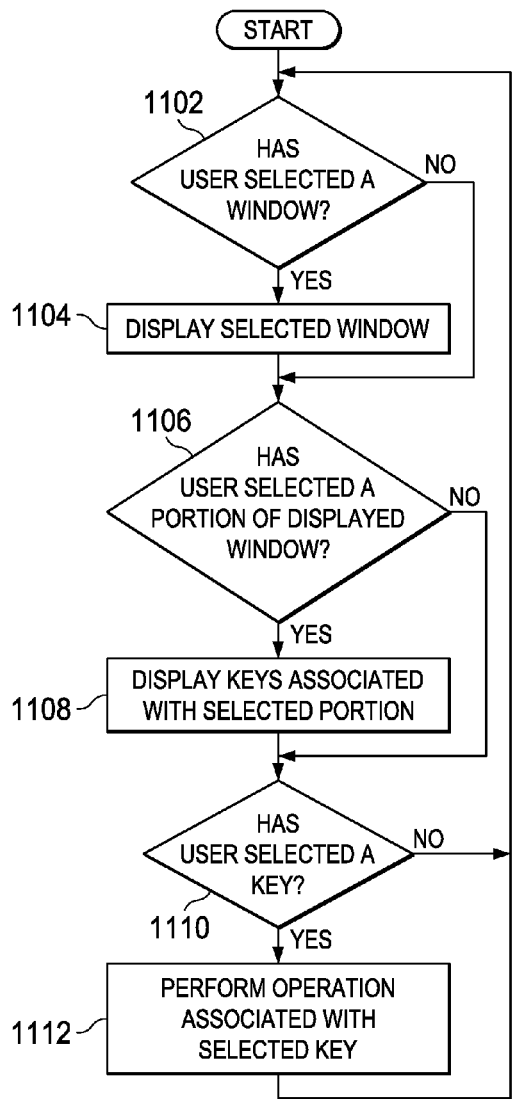
FIG. 11 is a flowchart of a first operation of the system of FIG. 1.

FIG. 11 is a flowchart of a first operation of the system 100. The first operation is discussed hereinabove in connection with FIGS. 3-9. At a step 1102, the system 100 determines whether the user 210 has selected a window. In response to the user 210 selecting a window, the operation continues from the step 1102 to a step 1104, at which the system 100 displays the selected window (e.g., FIG. 4) on the display device 102.

At a next step 1106, the system 100 determines whether the user 210 has selected a portion of the displayed window. In response to the user 210 selecting a portion of the displayed window, the operation continues from the step 1106 to a step 1108, at which the system 100 displays keys associated with the selected portion, such as: (a) in FIG. 5, the keys 502 in response to the user 210 selecting the text portion 402 of the maximize area window; (b) in FIG. 6, the keys 602 in response to the user 210 selecting the graphics portion 404 of the maximize area window; (c) in FIG. 8, the keys 802 in response to the user 210 selecting the remaining (e.g., text) portion of the calculations window; or (d) in FIG. 9, the keys 902 in response to the user 210 selecting the equation portion 702 of the calculations window.

At a next step 1110, the system determines whether the user 210 has selected a key. In response to the user 210 selecting a key, the operation continues from the step 1110 to a step 1112, at which the system 100 performs a respective operation associated with the selected key. After the step 1112, the operation returns to the step 1102.

At the step 1102, if the system 100 determines that the user 210 has not selected a portion of the displayed window, then the operation continues from the step 1102 to the step 1106. At the step 1106, if the system 100 determines that the user 210 has not selected a portion of the displayed window, then the operation continues from the step 1106 to the step 1110. At the step 1110, if the system 100 determines that the user 210 has not selected a key, then the operation returns from the step 1110 to the step 1102.

Figure 12:
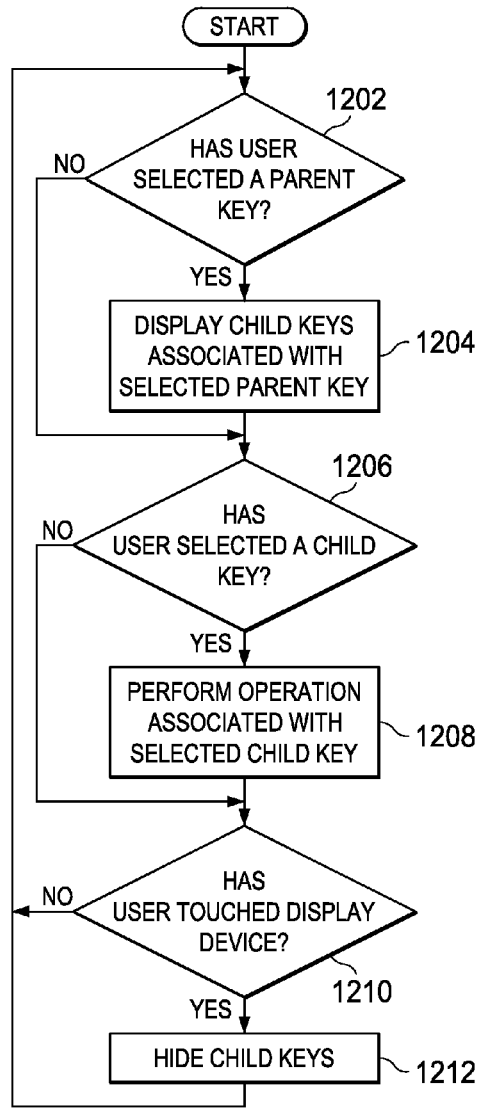
FIG. 12 is a flowchart of a second operation of the system of FIG. 1.

FIG. 12 is a flowchart of a second operation of the system 100. The second operation is discussed hereinabove in connection with FIG. 10. At a step 1202, the system 100 determines whether the user 210 has selected a parent key in the particular manner. In response to the user 210 selecting a parent key in the particular manner, the operation continues from the step 1202 to a step 1204, at which the system 100 displays child keys associated with the selected parent key.

At a next step 1206, the system 100 determines whether the user 210 has selected a child key. In response to the user 210 selecting a child key, the operation continues from the step 1206 to a step 1208, at which the system 100 performs a respective operation associated with the selected child key. At a next step 1210, the system 100 determines whether the user 210 has again touched the display device 102. In response to the user 210 again touching the display device 102, the operation continues from the step 1210 to a step 1212, at which the system 100 hides the child keys. After the step 1212, the operation returns to the step 1202.

At the step 1202, if the system 100 determines that the user 210 has not selected a parent key in the particular manner, then the operation continues from the step 1202 to the step 1206. At the step 1206, if the system 100 determines that the user 210 has not selected a child key, then the operation continues from the step 1206 to the step 1210. At the step 1210, if the system 100 determines that the user 210 has not again touched the display device 102, then the operation returns from the step 1210 to the step 1202.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for receiving information from a user, the method comprising:
   simultaneously displaying at least first and second portions of a window on a display device in response to a selection of the window by the user, wherein the second portion is nested within the first portion;
   in response to a user selecting the first portion of the window on the display device, displaying a first set of keys on the display device, wherein the first set of keys are operable by the user to specify a first type of information within the first portion of the window, and wherein the first type of information includes alphanumeric text information;
   in response to the user selecting the second portion of the window on the display device, displaying a second set of keys on the display device instead of the first set of keys, wherein the second set of keys are operable by the user to specify a second type of information within the second portion of the window, wherein the second type of information includes at least some information that is unsupported by operation of the first set of keys, wherein the second type of information includes at least one of graphics information and equation information, and wherein among the first and second sets of keys a subset of keys share a distinguishing characteristic for visually informing the user that the subset of keys are selectable by the user in a particular manner for causing the display device to display more keys; and
   in response to the user selecting a key in the subset of keys in the particular manner, displaying additional keys on the display device, wherein the additional keys are operable by the user to cause performance by the system of respective operations that are logically grouped and related to a respective operation of the selected key.

2. The method of claim 1, wherein displaying the window includes:
   displaying the window on a touchscreen of the display device, wherein the first portion of the window is selectable by touching the first portion of the window on the touchscreen, wherein the second portion of the window is selectable by touching the second portion of the window on the touchscreen, wherein the first set of keys are operable by touching the first set of keys on the touchscreen, and wherein the second set of keys are operable by touching the second set of keys on the touchscreen.

3. A system for receiving information from a user, the system comprising:
   a display device; and
   at least one non-transitory computer-readable medium and at least one processor for:
   simultaneously displaying at least first and second portions of a window on the display device in response to a selection of the window by the user, wherein the second portion is nested within the first portion; in response to a user selecting the first portion of the window on the display device, displaying a first set of keys on the display device, wherein the first set of keys are operable by the user to specify a first type of information within the first portion of the window, and wherein the first type of information includes alphanumeric text information; in response to the user selecting the second portion of the window on the display device, displaying a second set of keys on the display device instead of the first set of keys, wherein the second set of keys are operable by the user to specify a second type of information within the second portion of the window, wherein the second type of information includes at least some information that is unsupported by operation of the first set of keys, wherein the second type of information includes at least one of graphics information and equation information, and wherein among the first and second sets of keys a subset of keys share a distinguishing characteristic for visually informing the user that the subset of keys are selectable by the user in a particular manner for causing the display device to display more keys; and, in response to the user selecting a key in the subset of keys in the particular manner, displaying additional keys on the display device, wherein the additional keys are operable by the user to cause performance by the system of respective operations that are logically grouped and related to a respective operation of the selected key.

4. The system of claim 3, wherein the display device includes a touchscreen, and wherein displaying the window includes:
displaying the window on the touchscreen, wherein the first portion of the window is selectable by touching the first portion of the window on the touchscreen, wherein the second portion of the window is selectable by touching the second portion of the window on the touchscreen, wherein the first set of keys are operable by touching the first set of keys on the touchscreen, and wherein the second set of keys are operable by touching the second set of keys on the touchscreen.

5. A computer program product for receiving information from a user, the computer program product comprising:
a non-transitory computer-readable storage medium; and
a computer-readable program stored on the non-transitory computer-readable storage medium, wherein the computer-readable program is processable by an information handling system for causing the information handling system to perform operations including:

simultaneously displaying at least first and second portions of a window on a display device in response to a selection of the window by the user, wherein the second portion is nested within the first portion; in response to a user selecting the first portion of the window on the display device, displaying a first set of keys on the display device, wherein the first set of keys are operable by the user to specify a first type of information within the first portion of the window, and wherein the first type of information includes alphanumeric text information; in response to the user selecting the second portion of the window on the display device, displaying a second set of keys on the display device instead of the first set of keys, wherein the second set of keys are operable by the user to specify a second type of information within the second portion of the window, wherein the second type of information includes at least some information that is unsupported by operation of the first set of keys, wherein the second type of information includes at least one of graphics information and equation information, and wherein among the first and second sets of keys a subset of keys share a distinguishing characteristic for visually informing the user that the subset of keys are selectable by the user in a particular manner for causing the display device to display more keys; and, in response to the user selecting a key in the subset of keys in the particular manner, displaying additional keys on the display device, wherein the additional keys are operable by the user to cause performance by the system of respective operations that are logically grouped and related to a respective operation of the selected key.

6. The computer program product of claim 5, wherein displaying the window includes:
displaying the window on a touchscreen of the display device, wherein the first portion of the window is selectable by touching the first portion of the window on the touchscreen, wherein the second portion of the window is selectable by touching the second portion of the window on the touchscreen, wherein the first set of keys are operable by touching the first set of keys on the touchscreen, and wherein the second set of keys are operable by touching the second set of keys on the touchscreen.

\* \* \* \* \*